June 23, 1959     D. SHEPHARD     2,891,300
CUT-OFF TOOL

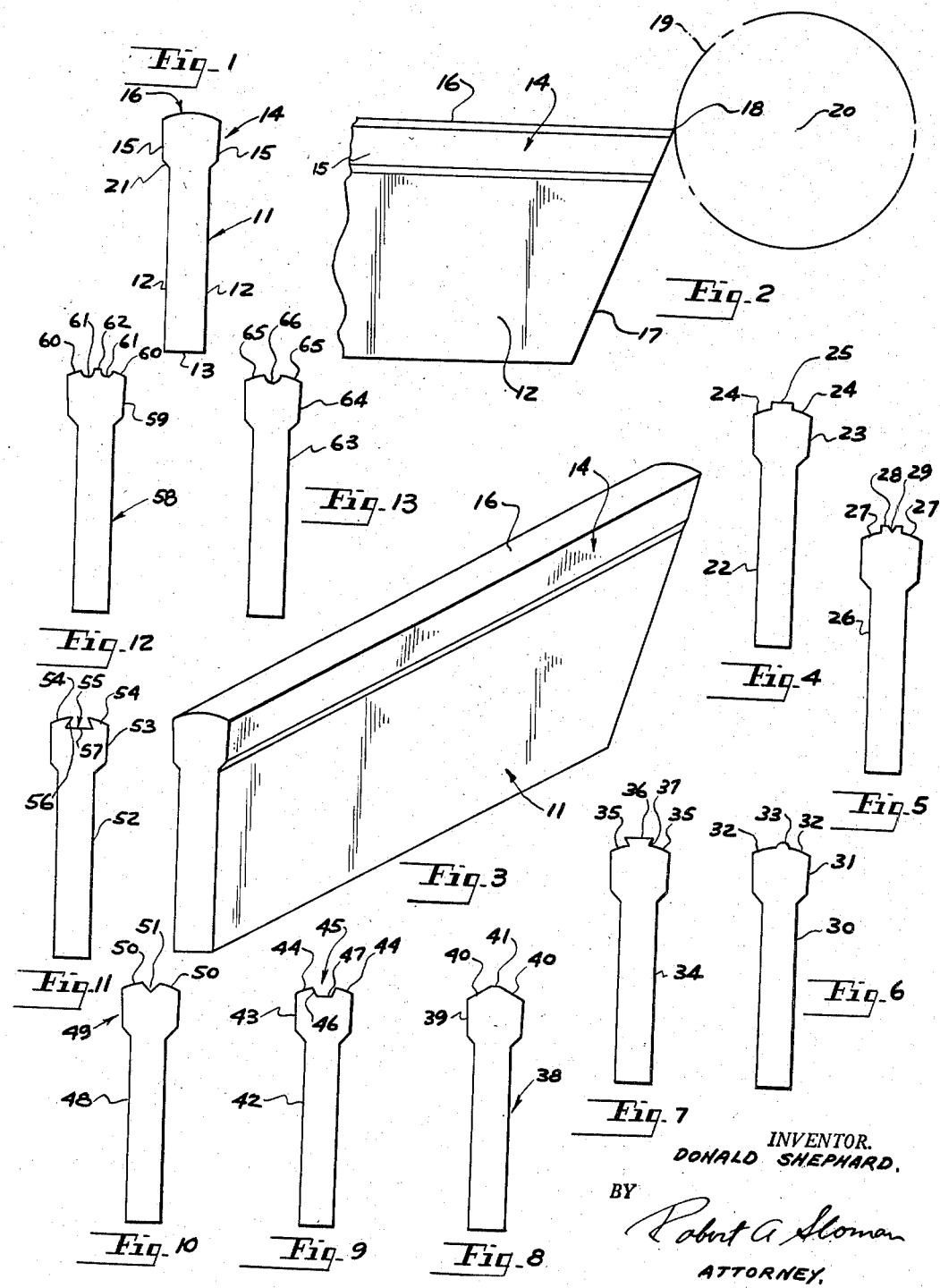

Filed Jan. 14, 1954     2 Sheets-Sheet 2

INVENTOR.
DONALD SHEPHARD.
BY
Robert A. Sloman
ATTORNEY.

UNITED STATES PATENT OFFICE 2,891,300
Patented June 23, 1959

2,891,300

CUT-OFF TOOL

Donald Shephard, Memphis, Mich., assignor of one-half to Evelyn De Mauro, Detroit, Mich., and one-half to Clifford C. Stone, Pacific Palisades, Calif.

Application January 14, 1954, Serial No. 404,060

5 Claims. (Cl. 29—95)

This invention relates to cutting tools, and more particularly to a cut-off tool blade or parting tool adapted for use on lathes, screw machines or other machine tools.

Heretofore, in the construction of tools of this type, there has existed the problem of undue heating and unnecessary friction between the cutting edge of the blade and adjacent portions thereof, and the wall of the cut and the chips cut therefrom. Various methods have been employed for minimizing friction and of providing adequate clearance between the blade and the part cut, such as will permit escape of the chip cut, so that it will not be crowded into and wedged between the blade and workpiece.

It is the object of the present invention to provide an improved cut-off blade which includes the greatly improved cutting edge, which is of such construction as will define the shape of the chip cut, such that it will break up as it is cut and will be thrown off the workpiece and cutting tool in such a fashion that friction and overheating will be minimized.

It is the further object of the present invention to provide a novel formation of workpiece engaging cutting edge such as will assure an efficient breaking up of the chips severed from the workpiece.

These and other objects will be seen from the following specification and claims, in conjunction with the appended drawings, in which:

Fig. 1 is an end elevational view of the present parting tool.

Fig. 2 is a fragmentary side elevational view thereof, illustrating its cutting relation with the center line of a workpiece shown in dotted lines.

Fig. 3 is a perspective view of the cut-off tool.

Fig. 4 is an end elevational view of the cut-off tool with a slightly different form of cutting edge.

Fig. 5 is a similar view with a different form of cutting edge.

Fig. 6 is a similar view with a different type of cutting edge.

Fig. 7 is a similar view with still a different type of cutting edge.

Fig. 8 is an end elevational view of a parting tool with a still different form of cutting edge.

Fig. 9 is a similar view of another variation thereof.

Fig. 10 is a similar view of another variation thereof.

Fig. 11 is a similar view of a slightly different form of cutting edge.

Fig. 12 is a similar view of a slightly different form of cutting edge.

Fig. 13 is a similar view of still another form of cutting edge.

Figure 14:
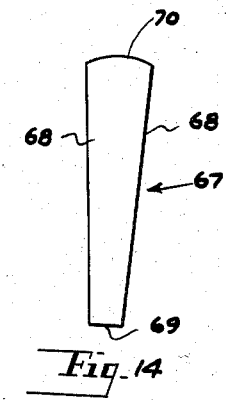
Fig. 14 is an end elevational view of a slightly different form of tool blade with tapered sides showing a cutting edge similar to that of Fig. 1.

It will be understood that the above drawings illustrate merely several preferred embodiments of the present invention, or variations in the shape of the cutting edge, and that other variations are contemplated within the scope of the claims hereafter set forth.

Referring to Figs. 1 and 2, there is shown a parting blade, which includes an elongated body 11 with opposed parallel sides 12, a flat longitudinal bottom edge 13, arranged at right angles thereto extending throughout the length of the tool and an enlarged head, generally indicated at 14, which extends throughout the upper longitudinal edge of the tool, as shown in Fig. 3.

Said head is of greater width than body 11 and has downwardly and inwardly tapered side walls 15, which at their lower ends are connected by angular portions 21 merging with body portions 12.

The enlarged longitudinally extended head 14 at the upper edge of the blade has a transversely convex shaped top edge 16; and at one end of the blade terminates in the downwardly and rearwardly extending front face 17.

The effective cutting edge of the blade is indicated at 18, the intersection of the convex surface 16, with the leading edge 17 of the blade.

In the preferred use of the blade as a cut-off blade or parting tool, this leading edge 18 is projected into operative engagement with the work 19 in substantial horizontal alignment with the workpiece axis of rotation 20, indicated in Fig. 2.

There has been found that by providing a top cutting edge for the head 14 of a convex formation, there is provided an improved efficiency of cutting, a reduced amount of heat and friction and a more efficient breaking up or bursting of the chips of metal severed from the workpiece.

While Fig. 1 illustrates a top edge which is generally convex, it is contemplated as part of the present invention that this top, generally convex edge, may have various types of longitudinally extending formations cut into or otherwise formed therein as shown, for illustration, in Figs. 4 through 13.

In Fig. 4 the blade 22 has a head 23 of substantially the same formation as head 14 of Fig. 1, however the top longitudinal edge has the cross-sectional shape shown in the drawing and which includes the outer marginal longitudinally extending convex marginal portions 24 and the central elongated upwardly projecting top edge 25, which is of general rectangular shape in cross-section.

The effective cutting edge in this case will be the top forward edge of the tool corresponding to cutting edge 18 of Fig. 2, and in view of the specific cross-sectional shape of Fig. 4, there will be cut from the workpiece a chip produced by the composite cutting edge formations 24 and 25.

Fig. 5 shows another blade 26, which also has the same head formation with the exception of its top surface which defines the cutting edge, and there is included a pair of marginal longitudinal extending convex edges 27 and intermediately thereof the upwardly projecting longitudinally extending edge 28. Said edge has a central longitudinally extending trough 29, which is of substantially V-shape in cross-section to thereby define with the leading edge 17, as at 18, a very effective workpiece cutting edge. It will be noted that the various formations in the top edge of the blade provide a clearly elongated cutting edge and this has the effect of forming chips, which have a tendency to automatically break up or explode, so as to be thrown clear of the workpiece, thereby minimizing heat and friction thereby prolonging the life of the blade.

As the tool becomes dull, it may be sharpened along its leading edge 17 along planes parallel to said edge whereby a very substantial part of the length of the blade may be used. In view of the continuous specific shape for the top edge of the tool, it is apparent that as the blade is sharpened from time to time, the configuration of the cutting edge 18 will be unchanged.

Fig. 6 shows a cutting blade 30 with an enlarged head 31, similar to head 14, and includes the top longitudinally extending marginal edges 32 of convex form and the central upwardly projecting longitudinally extending ridge 33, which is substantially semi-circular in cross-section, to thereby provide an efficient cutting edge.

A slight variaiton of the cut-off tool is indicated at 34 in Fig. 7, and which also includes the generally convex top edge. This top edge, which defines the cutting edge 18 at its intersection with the included end formation 17 includes the longitudinally extending convex oppositely arranged marginal portions 35, and centrally thereof the upwardly projecting longitudinal edge 36 which extends throughout the length of the blade, and which is generally of dovetail shape in cross-section, the side edges thereof 37 being tapered downwardly and inwardly as shown in the drawing.

Another variation of blade is designated at 38 in Fig. 8, and includes the enlarged head 39 similar to head 14 and forming its top edge a pair of longitudinally extending substantially flat edges 40, which are inclined upwardly from the outer marginal edge of the head and terminate in the central elongated flat portion 41 of appreciable width.

The parting tool 42 of Fig. 9 has a head 43 similar to head 14, but with the top longitudinal edge thereof including the convex marginal portions 44 and intermediate said portions the depressed trough 45, which has downwardly and inwardly inclined inner wall portions 46 and the flat bottom wall portion 47.

The variation of tool blade 48 shown in Fig. 10 includes a head 49, similar to head 14, with the top surface thereof including the elongated arcuate convex marginal portions 50, which extend throughout the length of the blade, the same as in Fig. 3, and throughout the top central portion of the top surface there is provided a longitudinally extending groove or trough 51, which is of V-shape in cross-section.

This edge in cooperation with the leading edge 17 of the cutting tool provides a very efficient cutting edge for the cut-off tool.

Another variation of blade 52 is shown in Fig. 11, and wherein the head 53 includes in its top edge the convex elongated marginal portions 54 and centrally thereof the elongated trough 55 of dovetail shape and wherein the bounding edges 56 diverge downwardly and outwardly terminating in the flat wall portion 57.

It is contemplated as a part of the present invention that the generally convex top edge of the blade head may have any number of irregular formations effecting the cross-sectional shape of the tool head, which formations extend throughout the length of the tool.

Fig. 12 shows still another variation where the tool 58 has a head 59, which includes as a part of its top surface the elongated marginal edges 60 of convex shape, and intermediate said edges are a pair of parallel longitudinally extending troughs 61, substantially semi-circular in cross-section, thereby defining the intermediate and central elongated edge 62, which is substantially flat but is preferably cut on the same radius as the marginal portions 60. Such a formation of the cutting head clearly produces an increased length of cutting edge and due to its irregularity effectively cuts chips in the metal stock, which will instantly break up and explode, disengaging themselves from the workpiece and the blade.

Blade 63 illustrates another formation wherein the head 64, though similar to the shape of head 14 has in its top surface the longitudinally extending marginal edges 65, which are convex in shape, and intermediate thereof there is provided the longitudinally extending depression or trough 66, which is substantially semi-circular in shape.

The inventor herein has defined in Figs. 1–13, a number of slight variations in the configuration of the top convex longitudinal edge for the parting tool by way of illustration. It is contemplated that the generally convex shape for the tool head improves its cutting efficiency. This efficiency is further improved by the various additional formations which have been made in the top edge which incorporate at least portions of the general convex formation.

It is contemplated that there may be other formations, which may also be made in the generally convex top surface which have been shown for purposes of illustration.

Fig. 14 is an end elevational view of a slightly different form of tool, which has a body 67, the opposite sides 68 of which, are tapered from the top to the bottom, so that there is not provided a separately defined head, such as is shown in Figs. 1–13, nevertheless the tapered side edges 68 which converge towards each other towards the lower longitudinal edge 69 of the tool thereby provide for sufficient clearance between the tool and the workpiece to minimize friction and heat.

The top longitudinal edge 70 of the blade 67 is generally convex and arcuate as shown and follows the top formation 16 of Fig. 1.

In order to avoid repetition of each of the other Figs. 4–13, it is submitted that the top edge 70 of tool 67 may be varied from that shown in Fig. 14 to any of the top edges heretofore above described, in connection with the blades of Figs. 4–13.

Fig. 14 is shown in the drawing to illustrate that the present invention and particularly the top convex edge of the tool may have any of the specific shapes above set forth.

Figure 15:
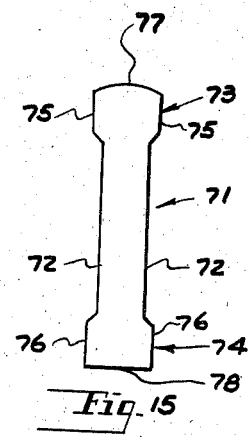
Fig. 15 is an end elevational view of a slightly different shape of cutting blade having a cutting edge similar to that shown in Fig. 1.

Similarly, Fig. 15 shows an end elevation of a tool 71, which has a cross-section similar to an I-beam including the parallel central side walls 72 and the two longitudinally extending heads 73 and 74 at its top and bottom longitudinal edges. It is contemplated that the head 73 has downwardly and inwardly tapered clearance edges 75, and that the head 74 has upwardly and inwardly tapered clearance edges 76.

The head 73 has a top edge 77, which is generally convex throughout the length of the tool, the same as above described in connection with Fig. 1. Here also the additional variations in the top edge shown in Figs. 2 through 13, may also be applied to this top edge 77.

The lower longitudinal head 74 has flat bottom edge 78, however it is contemplated that if the tool is to be reversed, this edge may be machined to the shape desired, such as any of the shapes shown in Figs. 1–13.

Figures 16, 17:
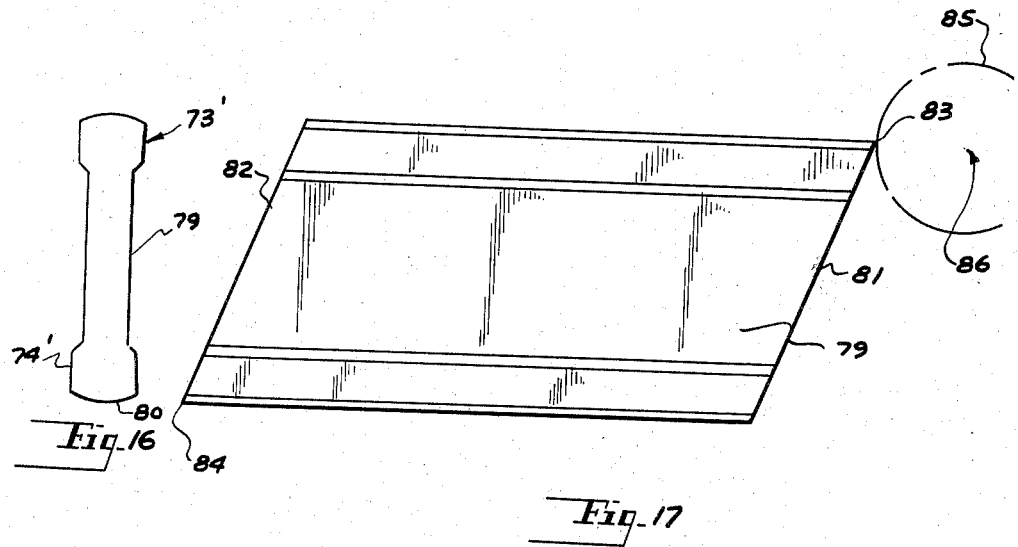
Fig. 16 is similar to Fig. 15 but shows such cutting edge initially formed upon opposite longitudinal edges of the blade, which is reversible.
Fig. 17 is a side elevational view thereof, and its relationship to a workpiece shown in dotted lines.

For illustration, the tool 79 of Fig. 16 is substantially the same as the tool blade 71 of Fig. 15, except that the bottom surface of the corresponding head 74' has been formed of a convex shape as at 80, so that in conjunction with the head 73' similar to head 73 of Fig. 15, this particular tool 79 may be reversible at any time, as indicated in Fig. 17. Here the parting tool includes the parallel end face portions 81 and 82 which are inclined as shown, to thereby define at the intersection of the top edge with one of the leading edges 81 or 82, the two cutting edges 83 and 84. In Fig. 17 the cutting edge 83 is in use and operatively engages workpiece 85 and lies substantially in a horizontal plane passing through the workpiece axis 86. Thus it is apparent that the tool 79 may be rotated 180 degrees and when turned end to end, may be used with the second cutting edge 84 before sharpening.

In a number of the variations of the invention shown in the drawing, and particularly in Figs. 5, 9, 10, 11, 12 and 13, there is shown formed within and intermediate of the convex surfaces making up the cutting edge, a secondary grind. Said secondary grind in each case is the depression in the top surface of the cutting edge and particularly is the depression 29 of Fig. 5, depression 45 of Fig. 9, groove 51 of Fig. 10, dovetail groove 55 of Fig. 11, the parallel spaced grooves 61 of Fig. 12 and the elongated groove 66 of Fig. 13.

It is contemplated that the cutting edge defined at the inter-section between the top surface of the tool and the leading edge 17 include the parallel spaced longitudinally extending convex portions and in the respects above noted, an intermediate longitudinally extending secondary grind. This has been shown by way of illustration in the above-mentioned figures, it being contemplated that other forms of secondary grind may be employed within the scope of the claims herein set forth.

Heretofore with cut-off blade constructions of the type where the cutting edge is flat or concave, the extremities of the cutting edge where they join the side edges of the head are thin. In other words, the metal at the cutting corners is thin and heats up quickly. Due to the limited metal at these points, the frictional heat from the cutting edge is conducted away slowly into the body of the blade. Thus, the tool wears out faster at these extremities and breaks down.

In the present invention wherein the cutting edge is convex, there is an increased amount of metal at the outer corners of the tool cutting edge. This means that the frictional heat developed during cutting is carried away faster and further, these corners are stronger and last longer. Therefore, this corner formation of the cutting edge as set forth herein prolongs the life of the blade and wear at these corners is minimized.

Heretofore, with the cutting edge of a parting tool concave, for illustration, the chip cut in a rotating work follows the shape of the cutting edge; it curves upwardly at its ends. The chip has a tendency to curl, and with the frictional heat of cutting, the chip has the tendency to further curl downwardly at its center towards the tool cutting edge. This means that in the types of cutting blades heretofore employed, there is more tendency for the curled chip to jam against the blade thereby causing increased frictional heat and blade wear.

In the present invention, with the general shape of the cutting edge convex, the chip cut has a corresponding shape with its central portion raised. As the chip further curls, due to heating, it will be projected upwardly away from the tool to thereby prevent jamming and rubbing of the chip within the cut in the work, which cause friction and heat.

The present use of a convex cutting edge is therefore a decided innovation in blade construction and results in less friction and heating. Thus, the cutting tool functions in an entirely new manner and effects a new method of cutting, and reduces chip friction, which is the main cause of tool breakdown.

Having described my invention, reference should now be had to the claims which follow for determining the scope thereof.

I claim:

1. A parting tool comprising an elongated blade body of uniform width, a head of increased width along one longitudinal edge thereof, said head having opposed longitudinally extending downwardly and inwardly tapered side walls and a top wall extending throughout the length of said head having opposed longitudinally extending transversely convex side portions and an elongated trough therebetween, the inner longitudinal edges of said side portions being elevated with respect to their outer longitudinal edges, said body and head having an end face downwardly and inwardly inclined from said top wall forming a cutting edge at its intersection with said top wall.

2. The tool of claim 1, said trough having a flat bottom wall and a pair of opposed upwardly and outwardly extending side walls.

3. The tool of claim 1, said trough being substantially of V-shape.

4. The tool of claim 1, said trough being of substantially dovetail shape.

5. The tool of claim 1, said trough transversely being of substantially semi-circular shape.

References Cited in the file of this patent

UNITED STATES PATENTS

| Number | Name | Date |
|---|---|---|
| 85,329 | Reid | Dec. 29, 1868 |
| 622,625 | Hill | Apr. 4, 1899 |
| 933,338 | Poole | Sept. 7, 1909 |
| 1,120,782 | Amborn | Dec. 15, 1914 |
| 1,738,912 | Luers | Dec. 10, 1929 |
| 1,912,666 | Swanson | June 6, 1933 |
| 2,176,265 | Luers | Oct. 17, 1939 |
| 2,187,512 | Capps | Jan. 16, 1940 |
| 2,202,591 | Luers | May 28, 1940 |
| 2,322,408 | Aber | June 22, 1943 |
| 2,344,442 | Luers | Mar. 14, 1944 |
| 2,390,653 | Kilgore | Dec. 11, 1945 |
| 2,424,473 | Luers | July 22, 1947 |
| 2,688,791 | Luers | Sept. 14, 1954 |

FOREIGN PATENTS

| Number | Country | Date |
|---|---|---|
| 718,805 | France | Jan. 29, 1932 |

OTHER REFERENCES

Article by S. J. Morgan, from American Machinist, April 27, 1922, page 639.

Pamphlet, "Cutting off Tools," by J. Milton Luers, Tools Mfg. by Empire Tool Co.